US009954956B2

(12) United States Patent
Adrangi et al.

(10) Patent No.: US 9,954,956 B2
(45) Date of Patent: Apr. 24, 2018

(54) SECURE DISCOVERY AND CONNECTION TO INTERNET OF THINGS DEVICES IN A WIRELESS LOCAL-AREA NETWORK

(71) Applicant: Intel IP Corporation, Santa Clara, CA (US)

(72) Inventors: Farid Adrangi, Lake Oswego, OR (US); Emily H. Qi, Portland, OR (US); Ganesh Venkatesan, Hillsboro, OR (US); Bahareh Sadeghi, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 40 days.

(21) Appl. No.: 15/079,066

(22) Filed: Mar. 24, 2016

(65) Prior Publication Data

US 2017/0063999 A1    Mar. 2, 2017

Related U.S. Application Data

(60) Provisional application No. 62/209,969, filed on Aug. 26, 2015.

(51) Int. Cl.
*H04L 12/26* (2006.01)
*H04L 29/08* (2006.01)
(Continued)

(52) U.S. Cl.
CPC ............ *H04L 67/125* (2013.01); *H04L 69/22* (2013.01); *H04W 4/005* (2013.01); *H04W 12/04* (2013.01);
(Continued)

(58) Field of Classification Search
None
See application file for complete search history.

(56) References Cited

U.S. PATENT DOCUMENTS 9,210,534 B1 * 12/2015 Matthieu ............... H04W 4/005
2014/0289366 A1 * 9/2014 Choi ..................... G06F 9/4451
709/218
(Continued)

FOREIGN PATENT DOCUMENTS

WO    WO-2015076661 A1    5/2015
WO    WO-2017034696 A1    5/2015

OTHER PUBLICATIONS

"International Application Serial No. PCT/US2016/042123, International Search Report dated Oct. 18, 2016", 3 pgs.
(Continued)

*Primary Examiner* — Otis L Thompson, Jr.
(74) *Attorney, Agent, or Firm* — Schwegman Lundberg & Woessner, P.A.

(57) ABSTRACT

Apparatuses, methods, and computer readable media for secure discovery and connection to internet of things devices in a wireless local-area network are disclosed. An apparatus of a station comprising processing circuitry is disclosed. The processing circuitry may be configured to: encode a first packet to indicate to an access point to start discovery of Internet of Things (IoT) devices, and decode a second packet from the access point. The second packet may include identifications of IoT devices unauthenticated with the access point. The processing circuitry may be configured to receive a selection from an application of the station of one of the one or more identifications of the IoT devices, and encode a third packet including the identification of the IoT device and an indication that the access point is to request establishment of a secure session with the IoT device.

22 Claims, 9 Drawing Sheets

(51) Int. Cl.
*H04W 12/06* (2009.01)
*H04L 29/06* (2006.01)
*H04W 12/04* (2009.01)
*H04W 4/00* (2018.01)
*H04W 84/20* (2009.01)
*H04W 8/00* (2009.01)

(52) U.S. Cl.
CPC ............ *H04W 12/06* (2013.01); *H04W 8/005* (2013.01); *H04W 84/20* (2013.01)

(56) References Cited

U.S. PATENT DOCUMENTS

| | | | |
|---|---|---|---|
| 2015/0006296 A1 | 1/2015 | Gupta et al. | |
| 2015/0036881 A1 | 2/2015 | Sharma et al. | |
| 2015/0067329 A1 | 3/2015 | Ben Saied et al. | |
| 2015/0142968 A1* | 5/2015 | Bhagwat | H04L 67/16 709/224 |
| 2015/0156266 A1* | 6/2015 | Gupta | H04L 67/12 709/224 |
| 2015/0195365 A1* | 7/2015 | Choi | H04L 67/16 715/739 |
| 2015/0199610 A1* | 7/2015 | Hershberg | G06N 5/047 706/12 |
| 2015/0201022 A1 | 7/2015 | Kim et al. | |
| 2015/0201035 A1* | 7/2015 | Profit | H04L 67/2842 709/213 |
| 2015/0230167 A1* | 8/2015 | Choi | H04W 48/20 455/411 |
| 2015/0326442 A1* | 11/2015 | Li | H04B 5/0056 709/223 |
| 2015/0358777 A1* | 12/2015 | Gupta | H04L 12/2807 370/254 |
| 2016/0036764 A1* | 2/2016 | Dong | H04L 61/3025 370/254 |
| 2016/0036819 A1* | 2/2016 | Zehavi | H04W 12/08 726/4 |
| 2016/0105305 A1* | 4/2016 | Pignataro | H04L 41/0893 709/223 |
| 2016/0105501 A1* | 4/2016 | Choi | H04L 63/08 709/225 |
| 2016/0259932 A1* | 9/2016 | Lakshmanan | G06F 21/44 |
| 2016/0323689 A1* | 11/2016 | Goluboff | H04L 63/0823 |
| 2016/0359664 A1* | 12/2016 | Malegaonkar | G06F 8/34 |
| 2016/0381030 A1* | 12/2016 | Chillappa, Sr. | H04L 63/102 726/11 |
| 2017/0005874 A1* | 1/2017 | Banerjee | H04L 67/125 |
| 2017/0006528 A1* | 1/2017 | Bari | H04W 48/16 |
| 2017/0180489 A1* | 6/2017 | Oh | H04L 67/16 |
| 2017/0208139 A1* | 7/2017 | Li | H04L 67/16 |
| 2017/0223130 A1* | 8/2017 | Profit | H04L 67/2842 709/213 |

OTHER PUBLICATIONS

"International Application Serial No. PCT/US2016/042123, Written Opinion dated Oct. 18, 2016", 6 pgs.

* cited by examiner

SECURE DISCOVERY AND CONNECTION TO INTERNET OF THINGS DEVICES IN A WIRELESS LOCAL-AREA NETWORK

PRIORITY CLAIM

This application claims the benefit of priority under 35 USC 119(e) to U.S. Provisional Patent Application Ser. No. 62/209,969, filed Aug. 26, 2015, which is incorporated herein by reference in its entirety.

TECHNICAL FIELD

Some embodiments relate to wireless devices. Some embodiments relate to Institute of Electrical and Electronic Engineers (IEEE) 802.11. Some embodiments relate to methods and devices for secure discovery and connection to Internet of Things (IoT) devices in a wireless local-area network (WLANs). Some embodiments relate to an application on a smart phone for connecting to and controlling IoT devices via an access point.

BACKGROUND

IoT devices are becoming more numerous. Connecting to IoT devices may not be easy because IoT devices may be simple devices that may not have all the functions of, e.g., a smart phone. Moreover, IoT devices need to operate with both newer protocols and with legacy devices.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
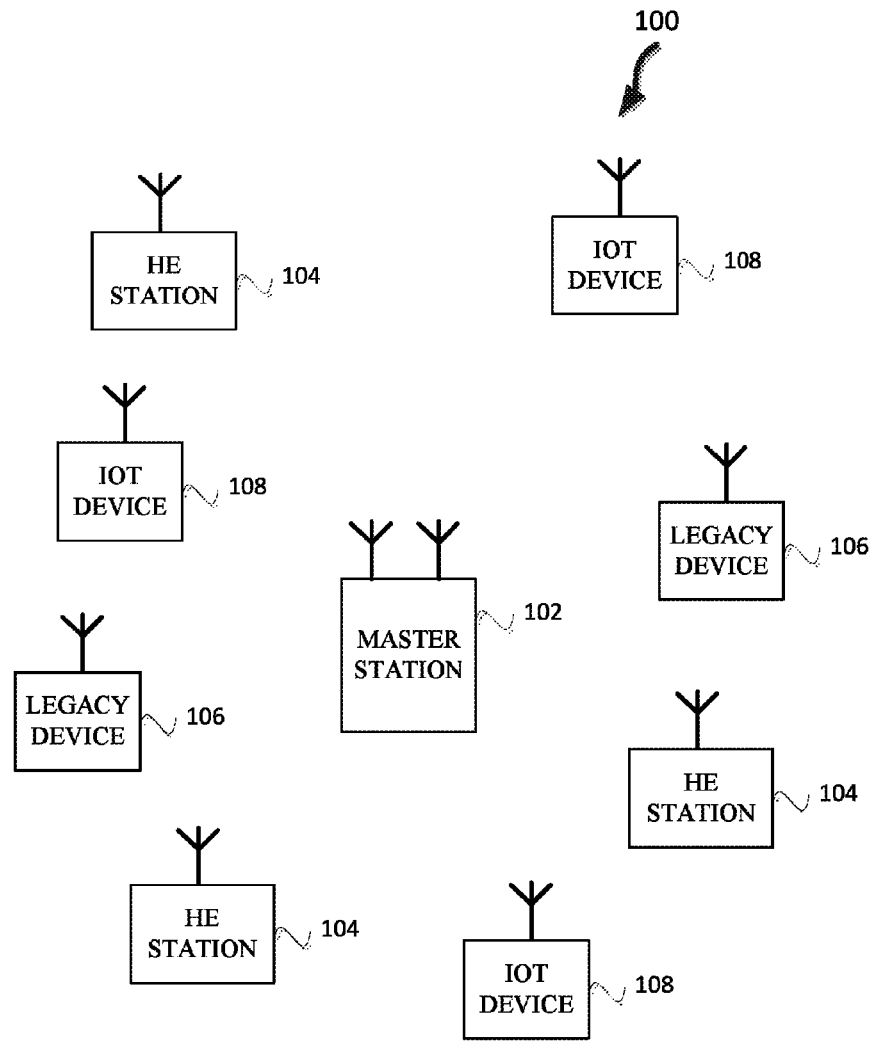
FIG. 1 illustrates a wireless network in accordance with some embodiments.

FIG. 1 illustrates a WLAN in accordance with some embodiments. The WLAN may comprise a basis service set (BSS) 100 that may include a master station 102, which may be an AP, a plurality of (e.g., IEEE 802.11) high-efficiency (HE) stations 104, a plurality of IoT device 108, and a plurality of legacy (e.g., IEEE 802.11) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11a/b/g/n/ac/ad/af/ah/aj/ay, or another legacy wireless communication standard. The legacy devices 106 may be STAs or IEEE STAs. The STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol.

The master station 102 may communicate with legacy devices 106, HE stations 104, and IoT device 108 in accordance with legacy IEEE 802.11 communication techniques. The HE stations 104 may be a newer (chronologically) version of an IEEE standard than the legacy device 104.

In some embodiments, a frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HE frame may be configured for transmitting a number of spatial streams, which may be in accordance with MU-MIMO. In other embodiments, the master station 102, HE station 104, and/or legacy device 106 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (Wi-MAX)), BlueTooth®, IoT related technologies, or other technologies.

The HE station 104 may be configured with applications that may be retrieved from remote servers (not illustrated). The IoT devices 108 may be simple devices. The IoT devices 108 may be low power devices. The IoT devices 108 may not include an interface for a user to access some functions that are settable of the IoT devices 108. The IoT device 108 may be low cost devices for controlling operations in a residential or business setting. In some embodiments the IoT devices 108 may be environmental reporting devices such as security devices and temperature devices. The IoT devices 108 may include representations of information such as universal product codes (UPC), radio-frequency identification (RFID) tags, quick response (QR) codes, near-field communication (NFC), or any other suitable codes. The information may include an identification of the IoT device 108 and may include information regarding the capabilities of the IoT device 108. Examples of IoT devices 108 include sensors like a door sensor, a smart light bulb, a thermometer sensor, a television controller or sensor, a home automation camera and/or microphone, etc. The IoT devices 108 may be configured with an initial configuration at manufacturing time. In some embodiments, the IoT devices 108 may be securely connected to the master station 102 and/or HE station 104 using the transmitter of the IoT device 108 so that a different form of configuration such as UPC, RFIF, QR, or NFC is may not be needed. The IoT device 108 may include embedded security parameters. In some embodiments, a user cannot interact with the IoT devices 108 manually to configure the IoT devices 108.

In some embodiments, the HE stations 104 may act as sensor hubs. In some embodiments the master station 102 may act as an access gateway. The master station 102 may be in communication with the Internet and one or more devices such as an access service, which may store a master password.

The HE station 104 may include one or more mobile device applications (apps). The mobile device apps may be downloaded from an external server (not illustrated) or preloaded on the HE station 104. The mobile device apps may have their own security that is in addition to the security of the HE stations 104. In some embodiments, the HE station 104 may act as a group owner (GO) where some functions of the master station 102 may be performed by the HE station 104, e.g., transmitting trigger frames.

In example embodiments, the HE stations 104, the master station 102, and/or IoT devices 108 are configured to perform the methods and functions herein described in conjunction with FIGS. 1-7.

Figure 2:
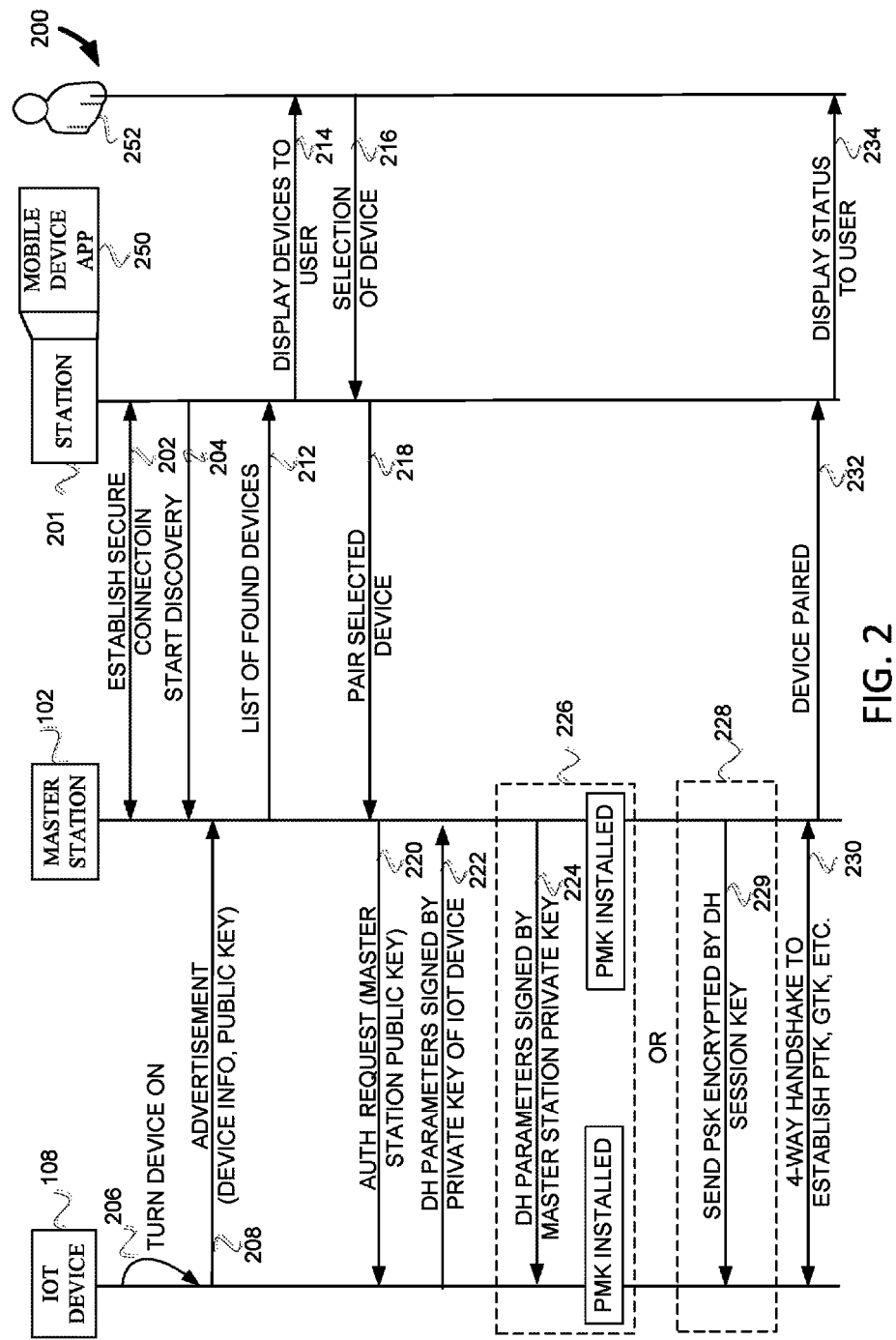
FIG. 2 schematically illustrates a method of secure discovery and connection to IoT devices in a WLAN in accordance with some embodiments.

FIG. 2 schematically illustrates a method 200 of secure discovery and connection to IoT devices 108 in a WLAN in accordance with some embodiments. Illustrated in FIG. 2 is IoT device 108, master station 102, station 201, phone application (app) 250, and user 252. Although, only one IoT device 108 is illustrated, there may be one or more IoT devices 108. The station 201 may be a HE station 104 or legacy station 106. The method 200 begins at operation 202 with establishing a secure connection between the master station 102 and station 201. The method 200 continues at operation 204 with start discovery. The station 201 may send an instruction to the master station 102 to discover IoT device 108.

In some embodiments, when the user 252 initiates the discovery process from the mobile device app 250 the user 252 may request to discover a specific category of IoT devices 108, e.g., door sensors. In this case, the mobile device app 250 will only display discovered "door sensor" devices (subset). The start discover 204 may include the category, which the master station 102 may use to filter advertisements 208 or the mobile device app 250 may filter the results back from the master station 102 (list of found devices 212).

In some embodiments, the master station 102 may be configured to discovery IoT devices 108 as part of a configuration. In some embodiments, the user 252 may issue an instruction to start discovery 204 to the station 201, which may convey the start discovery 204 message to the master station 102.

The master station 102 may in response to the discovery request start scanning (passive or active) on the specified channels (used for advertisement, i.e. channel 6). The specified channel may be determined based on wireless communication standard such as IEEE 802.11.

The method 200 continues at operation 206 with the IoT device 108 being turned own. For example, the IoT device 108 may be powered on by a user. In some embodiments, the IoT device 108 may wake up from a sleep cycle. In some embodiments, the IoT device 108 may turn on from receiving power.

The method 200 continues at operation 208 with the IoT device 108 transmitting an advertisement that may include device information and a public key of the IoT device 108. The advertisement 208 may be an advertisement as described in conjunction with Table 1 below. The operations may be in a different order. For example, operation 206 may be first with operation 202 coming second.

The method 200 continues at operation 212 with a list of found devices being sent to the station 201. For example, the list of found devices may include the IoT device 108 with the device information and public key.

The method 200 continues at operation 214 with displaying devices to the user. For example, the mobile device app 250 may display the list of found devices on a display of the station 201. In some embodiments, the mobile device app 250 or another application may automatically select a device. For example, the mobile device app 250 may automatically select IoT devices 108 that are within a given proximity of the station 201.

The method 200 continues at operation 216 with selection of a device 216. For example, the user 252 may touch a screen of the station 201 that selects a device.

The method 200 continues at operation 218 with pair selected device. For example, the station 201 may send a request to the master station 102 to pair the selected device.

The method 200 continues at operation 220 with the master station 102 transmitting an authentication (auth) request that may include the public key of the master station 102 to the IoT device 104. The message of operation 220 may be a public action message.

The method 200 continues at operation 222 with the IoT device 108 transmitting Diffie-Hellman (DH) parameters signed by the IoT device 108. The message of operation 222 may be a public action message.

The method 200 may continue at box 226 or box 228. At box 226, the method 200 continues at operation 224 with the master station 102 transmitting DH parameters signed by the private key of the master station 102 to the IoT device 108. The master station 102 and the IoT device 108 then have enough to determine the pairwise master key (PMK). The message of operation 224 may be a public action message.

At box 228, the method 200 continues at operation 229 with the master station 102 transmitting pre-shared key (PSK) encrypted by DH session key to the IoT device 108. The message of operation 229 may be a public action message.

The method 200 continues at operation 230 with a 4-way handshake to establish a pairwise transient key (PTK), group transient key (GTK), etc. One or more the keys may be optional. One skilled in the art would recognize that different session keys may be generated in accordance with the 4-way handshake by the IoT device 108 and master station 102. One skilled in the art would recognize that another method may be used to authenticate the IoT device 108 and generate keys for encrypting messages. The messages of operation 230 may be a public action messages.

The method 200 may continue at operation 232 with the master station 102 transmitting a message to indicate that the devices are paired to the station 201. The method 200 may continue at operation 234 with the station 201 displaying a message to the user 252 that the IoT device 108 is paired with the master station 102. Operation 234 may be optional.

Figure 3:
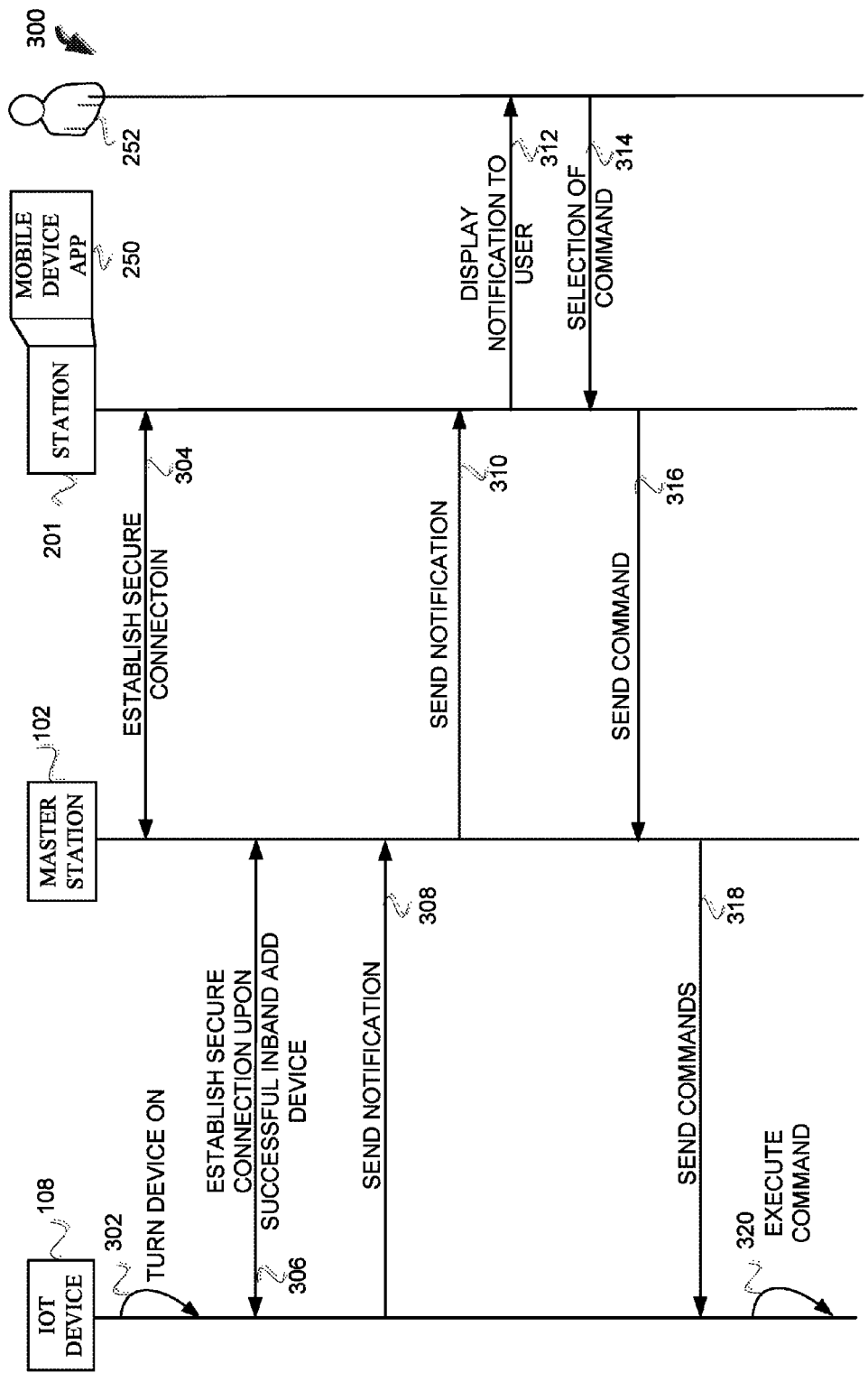
FIG. 3 schematically illustrates a method of secure discovery and connection to IoT devices in a WLAN in accordance with some embodiments.

FIG. 3 schematically illustrates a method 300 of secure discovery and connection to IoT devices 108 in a WLAN in accordance with some embodiments. Illustrated in FIG. 3 is IoT device 108, master station 102, station 201, mobile device app 250, and user 252. Although, only one IoT device 108 is illustrated, there may be one or more IoT devices 108.

The method 300 continues at operation 302 with the IoT device 108 being turned own. For example, the IoT device 108 may be powered on by a user. In some embodiments, the IoT device 108 may wake up from a sleep cycle. In some embodiments, the IoT device 108 may turn on from receiving power.

The method 300 may continue at operation 304 with establishing a secure connection between the master station 102 and the station 201. The master station 102 and station 201 may establish a secure connection in one of the ways described in conjunction with FIG. 2. In some embodiments, the master station 102 and the station 201 may establish a secure connection using a different method than disclosed in conjunction with FIG. 2.

The method 300 may continue at operation 306 with establishing a secure connection upon successful in-band add device. For example, the station 201 may send a message to the maser station 102 to add the IoT device 108 as disclosed in conjunction with FIG. 2. The IoT device 108 and the master station 102 may establish a secure connection as disclosed in conjunction with FIG. 2. In some embodiments, the IoT device 108 and master station 102 may establish a secure connection using a different method than disclosed in conjunction with FIG. 2.

The method 300 may continue at operation 308 with the IoT device 108 transmitting a notification 308 to the master station 102. For example, the IoT device 108 may send a notification over the established secure connection. A notification may include an indication of an event such as a temperature change, a temperature being above or below a range, an indication that the IoT device 108 detects movement, etc.

The method 300 may continue at operation 310 with the master station 102 sending the notification to the station 201. For example, the master station 102 may send the notification to the station 201 over the established secure connection between the master station 102 and the station 201. The master station 102 may decrypt the message 308 and then encrypt it using the secure connection between the master station 102 and the station 201.

The method 300 may continue at operation 312 with displaying notifications to the user. For example, mobile device app 250 may display the notification on a display of the station 201. The mobile device app 250 may display one or more commands for the user 252 to select in response to the notification. For example, a command may be to instruct the IoT device 108 to upload measure data, to change a sleep cycle of the IoT device 108, to change a frequency with which the IoT device 108 measures data, to activate an actuator of the IoT device 108 (e.g., to lock a window or door), etc. The display of operation 312 may be in accordance with the screen 500 illustrated in FIG. 5.

The method 300 may continue at operation 314 with the user 252 selecting a command in response to the notification. For example, the user 252 may select one of the commands disclosed herein. In some embodiments, a command may not be selected. The user 252 may choose to ignore the notification in which case operations 314, 316, and 318 may not be performed. In some embodiments, the mobile device app 250 may automatically select a command without direct user 252 selection. For example, the mobile device app 250 may be configured to respond to a notification that measured data is available from the IoT device 108 with a command to the IoT device 108 to upload the measured data.

The method 300 continues at operation 316 with the station 201 sending the command to the master station 102. For example, the station 201 may transmit the command to the master station 102 using the secure connection established in operation 304.

The method 300 may continue at operation 318 with the master station 102 sending the command to the IoT device 108. For example, the master station 102 may transmit the command to the IoT device 108 using the secure connection established at operation 306. The master station 102 may decrypt the message 316 and then encrypt it using the secure connection between the master station 102 and the IoT device 108.

The method 300 may continue with the IoT device 108 executing the command received from the master station 102. The method 300 may continue with one or more additional operations or the method 300 may end.

Figure 4:
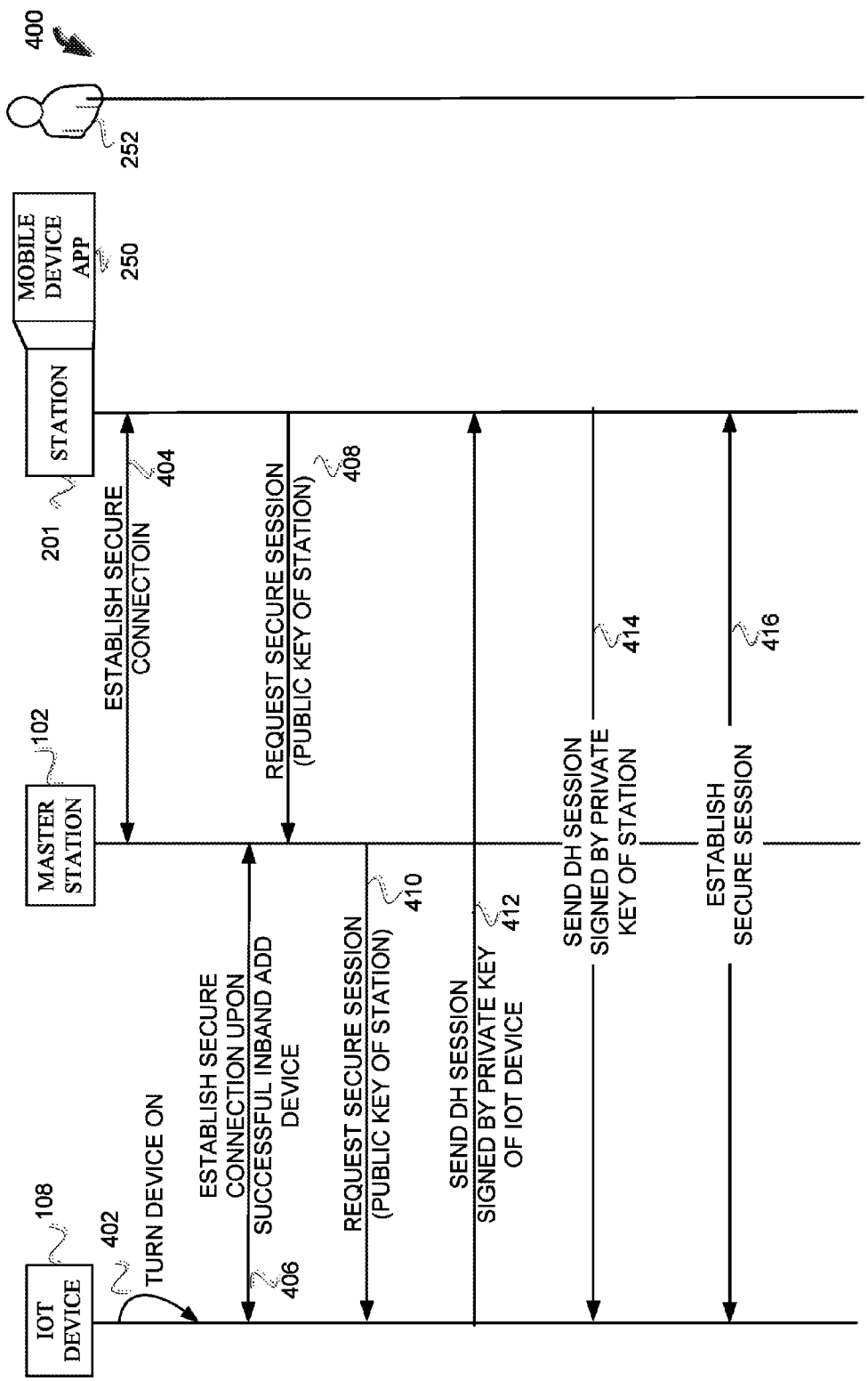
FIG. 4 schematically illustrates a method of secure discovery and connection to IoT devices in a WLAN in accordance with some embodiments.

FIG. 4 schematically illustrates a method 400 of secure discovery and connection to IoT devices 108 in a WLAN in accordance with some embodiments. Illustrated in FIG. 4 is IoT device 108, master station 102, station 201, mobile device app 250, and user 252. Although, only one IoT device 108 is illustrated, there may be one or more IoT devices 108.

The method 400 may begin at operation 402 with the IoT device 108 being turned own. For example, the IoT device 108 may be powered on by a user. In some embodiments, the IoT device 108 may wake up from a sleep cycle. In some embodiments, the IoT device 108 may turn on from receiving power.

The method 400 may continue at operation 404 with establishing a secure connection between the master station 102 and the station 201. For example, one or more of the methods disclosed herein may be used for establishing a secure connection.

The method 400 may continue at operation 406 with establishing a secure connection upon successful in-band add device. For example, the station 201 may send a message to the maser station 102 to add the IoT device 108 as disclosed in conjunction with FIG. 2. The IoT device 108 and the master station 102 may establish a secure connection as disclosed in conjunction with FIG. 2 or 3. In some embodiments, the IoT device 108 and master station 102 may establish a secure connection using a different method than disclosed in conjunction with FIG. 2.

The method 400 may continue at operation 408 with requesting secure session with a public key of the station 201. The message of operation 408 may be a public action message. For example, the station 201 may request that the IoT device 108 establish a secure session with the station 201. The public key may be associated with the mobile device app 250.

The method 400 may continue at operation 410 with the master station 102 forwarding the request secure session to the IoT device 108. The message of operation 410 may be a public action message.

The method 400 may continue at operation 412 with the IoT device 108 sending a DH session signed by the private key of the IoT device 108. The IoT device 108 may send the DH session to the station 201 using a MAC address of the station 201. The message of operation 412 may be a public action message. In some embodiments, the message of operation 412 may be sent directly to the station 201. In some embodiments, the message of operation 412 may be sent to the master station 102 and relayed to the station 201.

The method 400 may continue at operation 414 with the station 201 sending a DH session signed by the private key of the station. The private key may be generated or part of the mobile device app 250. The message of operation 414 may be a public action message. In some embodiments, the message of operation 414 may be sent directly to the station 201. In some embodiments, the message of operation 414 may be sent to the master station 102 and relayed to the station 201.

The method 400 may continue at operation 416 with establishing secure session 416. For example, one of the methods described in conjunction with FIG. 2 may be used to complete the secure session and establish keys to use to encrypt and decrypt messages between the IoT device 108 and the station 201 and/or mobile device app 250. The message of operation 416 may be a public action message. In some embodiments, the message of operation 416 may be sent directly to the station 201. In some embodiments, the message of operation 416 may be sent to the master station 102 and relayed to the station 201. The method 400 may continue with one or more additional operations or the method may end.

Figure 5:
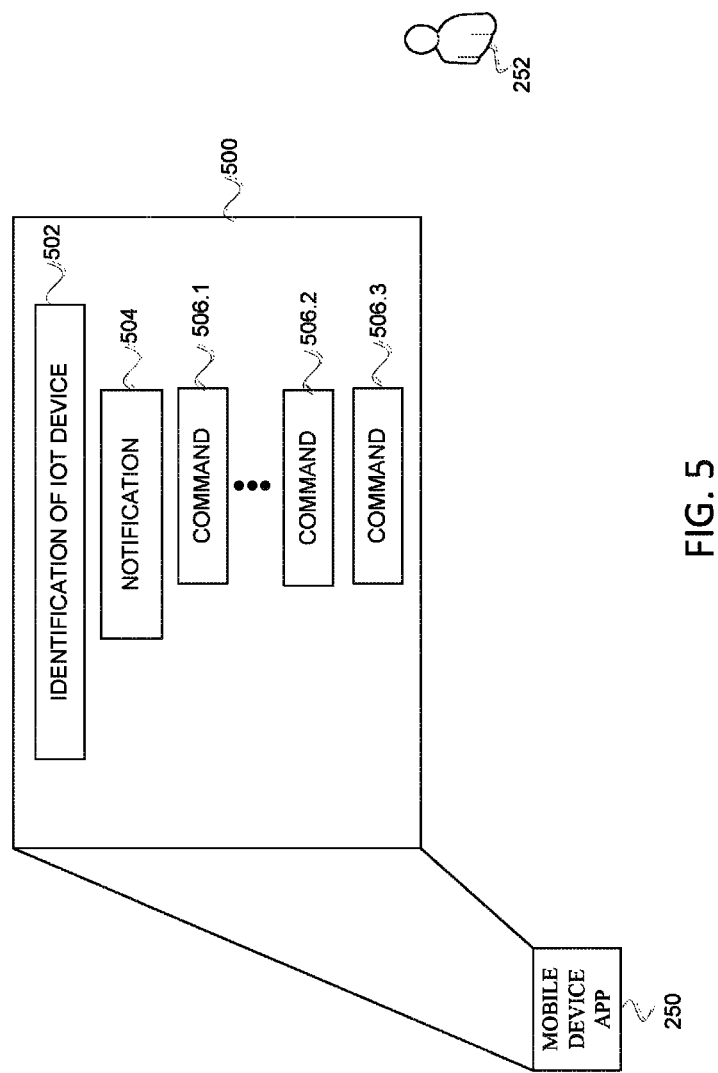
FIG. 5 illustrates an interface of a mobile device application in accordance with some embodiments.

FIG. 5 illustrates an interface of a mobile device application 250 in accordance with some embodiments. Illustrated in FIG. 5 is a mobile device app 250, screen 500, identification of IoT device 502, notification 504, user 252, and commands 506. The mobile device app 250 may display the identification of IoT device 502, a notification 504, and one or more commands 506 the user 252 may select. The identification of IoT device 502 may be a description of the IoT device 502 transmitted to the station 201. The notification 504 may be a notification from the IoT device 108 such as described in conjunction herein and in conjunction with FIG. 3. There may be more than one notification 504. The commands 506 may be commands that are commands for the IoT device 108 that sent the notification 504, or the commands may include commands that are generated by the mobile device app 250. For example, the notification 504 may be an indication that a motion sensor was activated and the mobile device app 250 may offer as one of the commands 506 a command to turn on a light.

Figure 6:
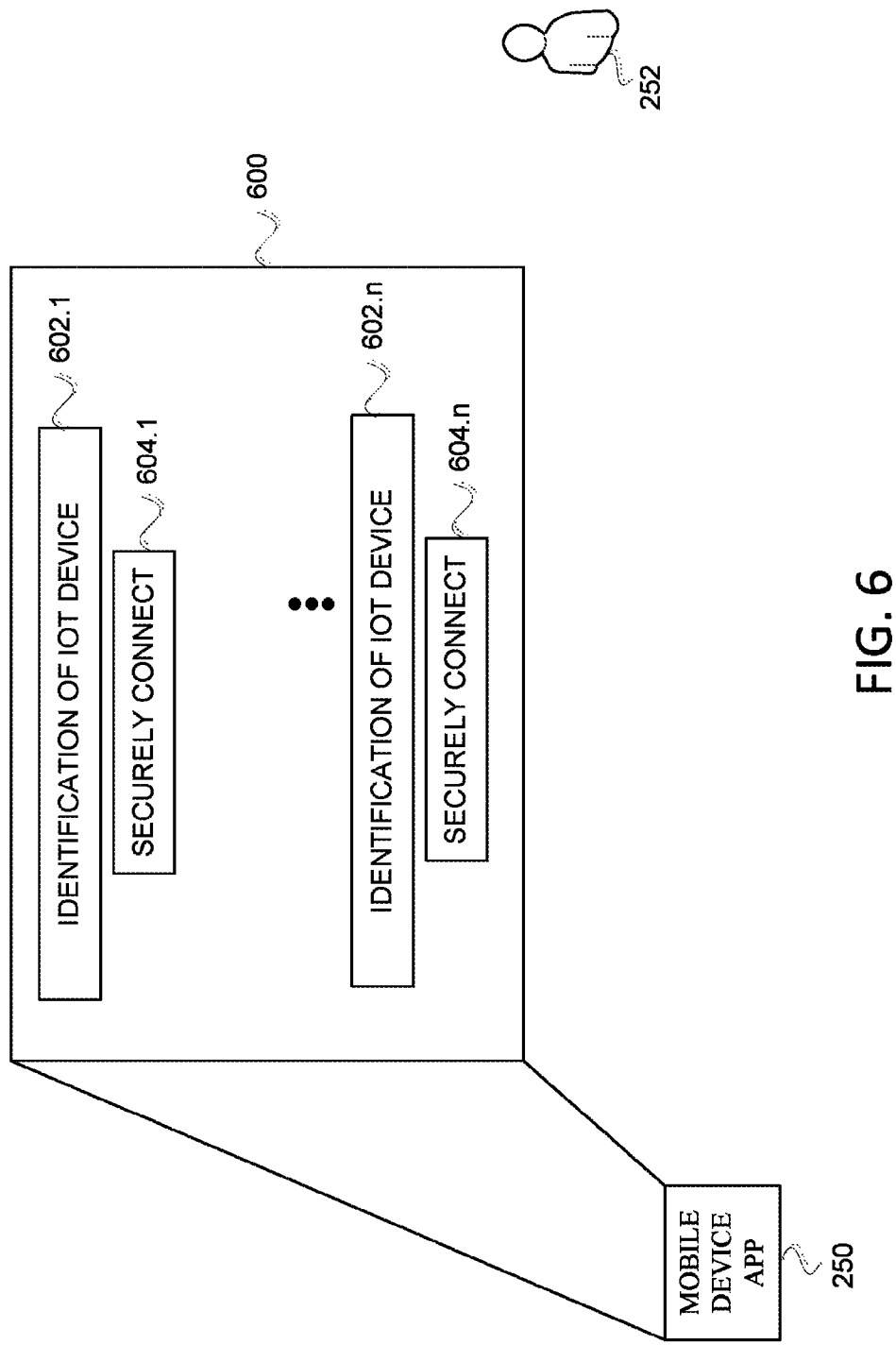
FIG. 6 illustrates an interface of a mobile device application in accordance with some embodiments.

FIG. 6 illustrates an interface of a mobile device application 250 in accordance with some embodiments. Illustrated in FIG. 6 is a mobile device app 250, screen 600, identification of IoT device 602, and securely connect 604.

The identification of IoT device 502 may be a description of the IoT device 502 transmitted to the station 201. The securely connect 604 may generate a message to the master station 102 such as the message of operation 216 (FIG. 2). In some embodiments the securely connect 604 may generate a message to the master station 102 such as the message of operation 408. In some embodiments, the screen 600 may offer the option of connecting to the IoT device 108 with the identification of IoT device 602 via the master station 102 (FIG. 2, operation 216) or directly with the IoT device 108 (FIG. 4, operation 408). The screen 600 may display n identification of IoT devices 502 with a corresponding securely connect 604. In some embodiments, touching the identification of IoT device 502 will begin the pairing process. One skilled in the art would recognize that the screen 600 may be presented in many different ways.

Table 1 illustrates public action frames that may be used by IoT devices 108. The public action frames may be used to carry advertisements by the IoT devices 108. The IoT devices 108 may use an assigned channel to advertise their device specific and security information. The device-specific information may include device identification (ID), manufacturing ID, serial number, a short device description (which may be used by the mobile device app 250), etc. The security information includes device public key and other security information. The advertisement 208 (FIG. 2) may be a public action frame with the device-specific information and security information as described herein.

TABLE 1

Public Action Frames

| Field | Size (Octets) | Value (Hex) | Description |
|---|---|---|---|
| Category | 1 | 0x04 | IEEE 802.11 Public Action Frame |
| Action Field | 1 | 0x09 | IEEE 802.11 Public Action Frame Vendor Specific |
| organizationally unique identifier (OUI) | 3 | 0x50-6F-9A | Wi-Fi Allicance (WFA) specific OUI |
| OUI Type | 1 | To be determined (TBD) | Identifying the type and version of Distributed Protocol Polling (DPP) |
| OUI Subtype | 1 | To be determined (TBD) | Identifying the type of frame carrying advertisement messages, Auth Request, response, Auth confirmation, etc . . . |
| elements | Variable | Variable | One or more elements defined IEEE 802.11 and WFA. DPP attributes can be included in DPP elements. |

Some embodiments of the methods, apparatuses and computer readable media do not incur the manufacturing overhead resulting from device-specific configuration. For example, in some embodiments, there is no need for configuring NFC or QR codes with device-specific and security information. Some embodiments do not require the IoT device to be equipped with additional hardware (e.g., NFC). Some embodiments do not require the QR code (with device specific information) to be printed on the devices at the manufacturing time. Some embodiments do not require the station 201 (e.g., a mobile telephone) to equipped with NFC reader.

Some embodiments do not require the user to locate NFC tag or QR code on the device. Some embodiments do not require the user to be in physical proximity of the IoT device 108 to tap or read the QR code. Some embodiments do not require QR-codes or NFC to transfer public keys of the IoT device 108 to the master station 102. The public keys may be transmitted to the master station 102 as described in conjunction with FIGS. 2-4.

Figure 7:
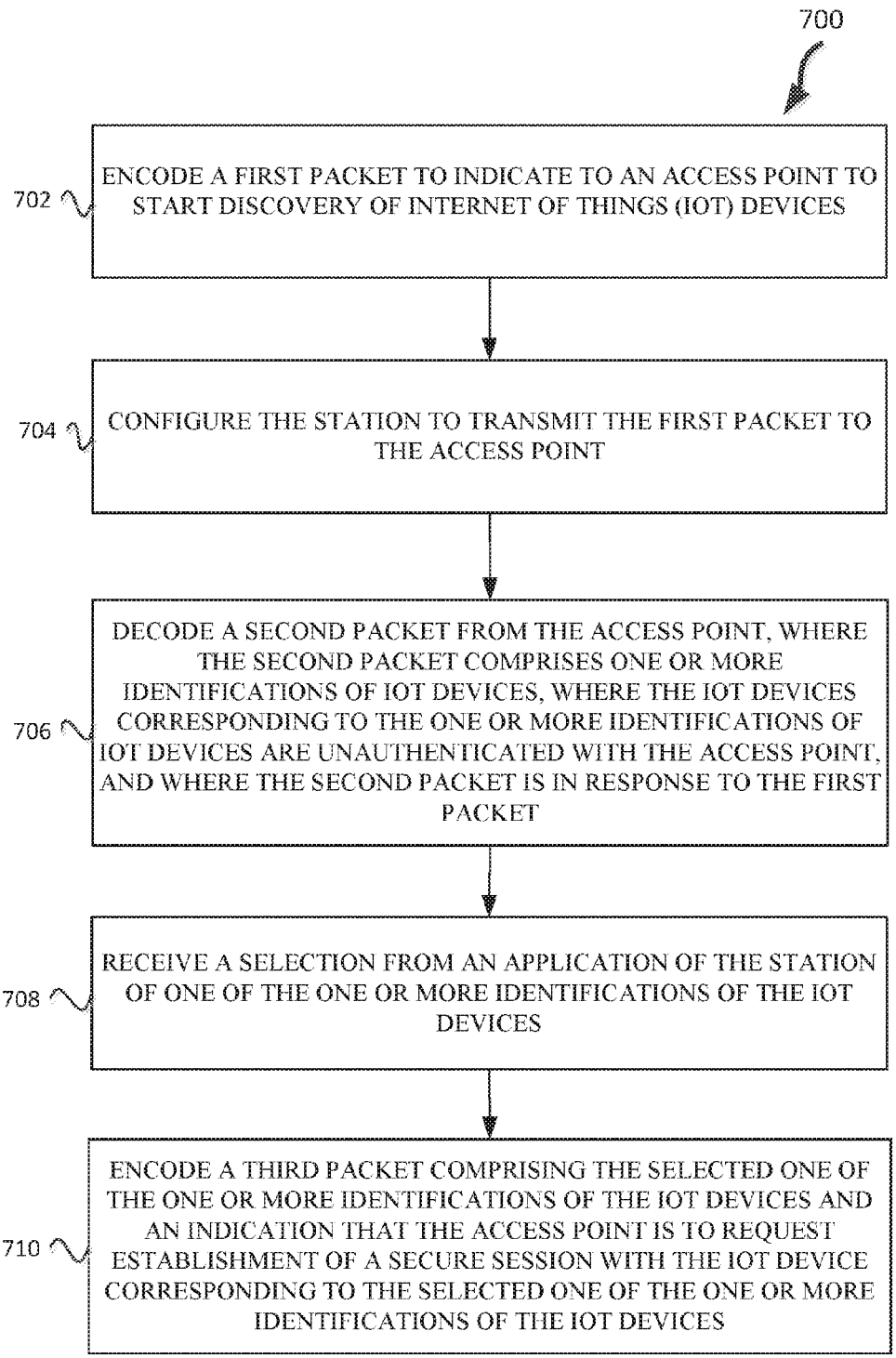
FIG. 7 illustrates a method of secure discovery and connection to IoT devices in a WLAN in accordance with some embodiments.

FIG. 7 illustrates a method 700 of secure discovery and connection to IoT devices in a WLAN in accordance with some embodiments. The method 700 begins at operation 702 with encoding a first packet to indicate to an access point to start discovery of Internet of Things (IoT) devices. For example, station 201 may encode start discovery 204 as described in conjunction with FIG. 2.

The method 700 may continue at operation 704 with configuring the station to transmit the first packet to the access point. For example, the station 201 may be configured to transmit the start discovery 204 packet as described in conjunction with FIG. 2.

The method 700 may continue at operation 706 with decoding a second packet from the access point, where the second packet comprises one or more identifications of IoT devices, and where the IoT devices corresponding to the one or more identifications of IoT devices are unauthenticated with the access point. The second packet may be in response to the first packet. For example, station 201 may receive list of found devices 212 from the master station 102 as described in conjunction with FIG. 2.

The method 700 may continue at operation 708 with receiving a selection from an application of the station of one of the one or more identifications of the IoT devices. For example, station 201 receives the selection of device 216 from user 252 as described in conjunction with FIG. 2.

The method 700 may continue at operation 710 with encoding a third packet comprising the selected one of the one or more identifications of the IoT devices and an indication that the access point is to request establishment of a secure session with the IoT device corresponding to the selected one of the one or more identifications of the IoT devices. For example, the station 201 may encode pair of selected device 218 as described in conjunction with FIG. 2.

Figure 8:
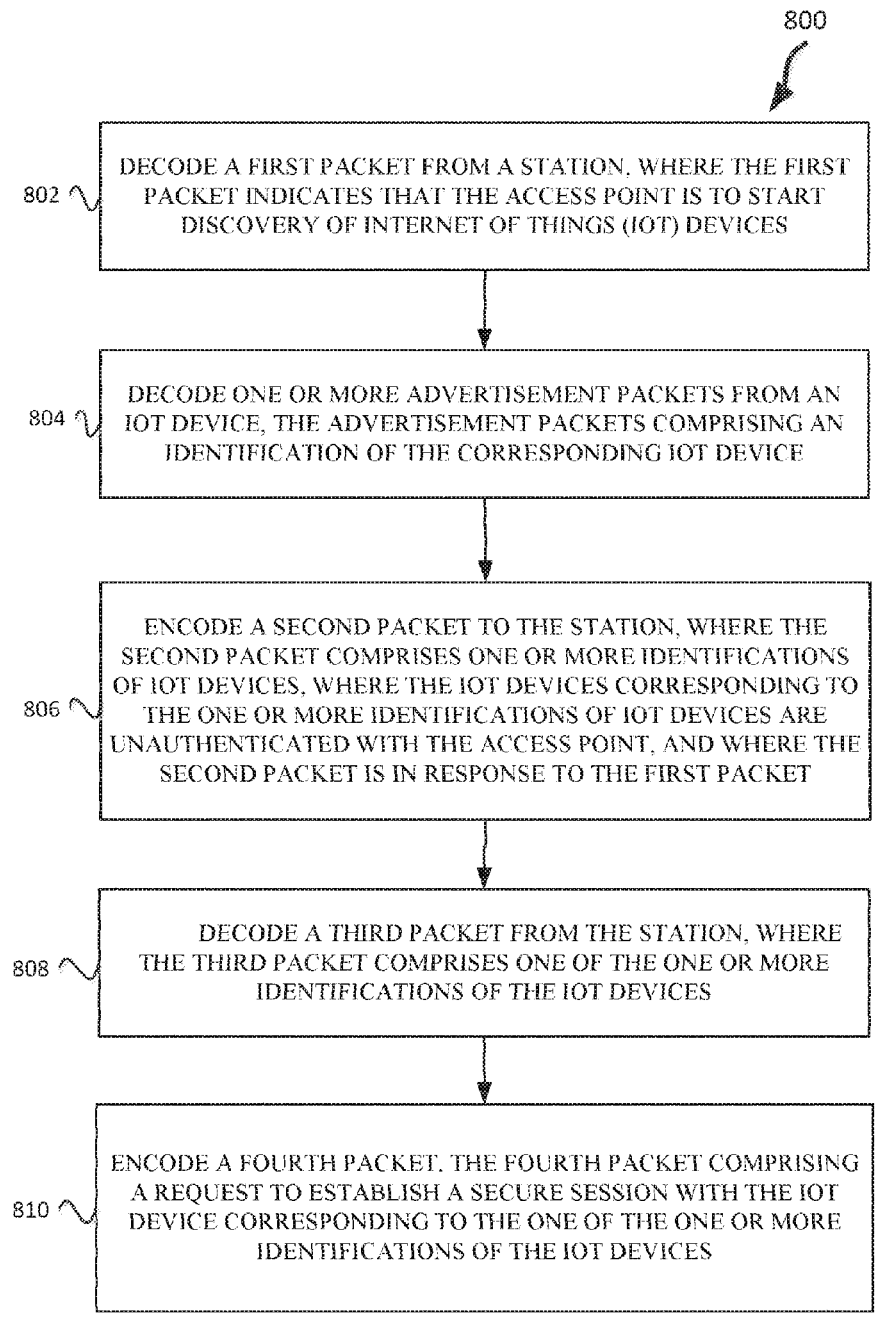
FIG. 8 illustrates a method of secure discovery and connection to IoT devices in a WLAN in accordance with some embodiments.

FIG. 8 illustrates a method 800 of secure discovery and connection to IoT devices in a WLAN in accordance with some embodiments. The method 800 may begin at operation 802 with decoding a first packet from a station, where the first packet indicates that the access point is to start discovery of IoT devices. For example, master station 102 may receive start discovery 204 as described in conjunction with FIG. 2.

The method 800 may continue with decoding one or more advertisement packets from an IoT device, the advertisement packets comprising an identification of the corresponding IoT device. For example, master station 102 may decode advertisement 208 packet as described in conjunction with FIG. 2.

The method 800 may continue with encoding a second packet to the station. The second packet may comprise one or more identifications of IoT devices. The IoT devices corresponding to the one or more identifications of IoT devices may be unauthenticated with the access point. The second packet is in response to the first packet. For example, the master station 102 may send list of found devices 212 in response to the start discovery 204 packet as described in conjunction with FIG. 2.

The method 800 may continue with decoding a third packet from the station, where the third packet comprises one of the one or more identifications of the IoT devices. For example, the master station 102 may decode pair selected device 218 packet from the station 201 as described in conjunction with FIG. 2.

The method 800 may continue with encoding a fourth packet, the fourth packet comprising a request to establish a secure session with the IoT device corresponding to the one of the one or more identifications of the IoT devices. For example, the master station 102 may encode authentication request 220 packet that is to be transmitted to the IoT device 108 as described in conjunction with FIG. 2.

Figure 9:
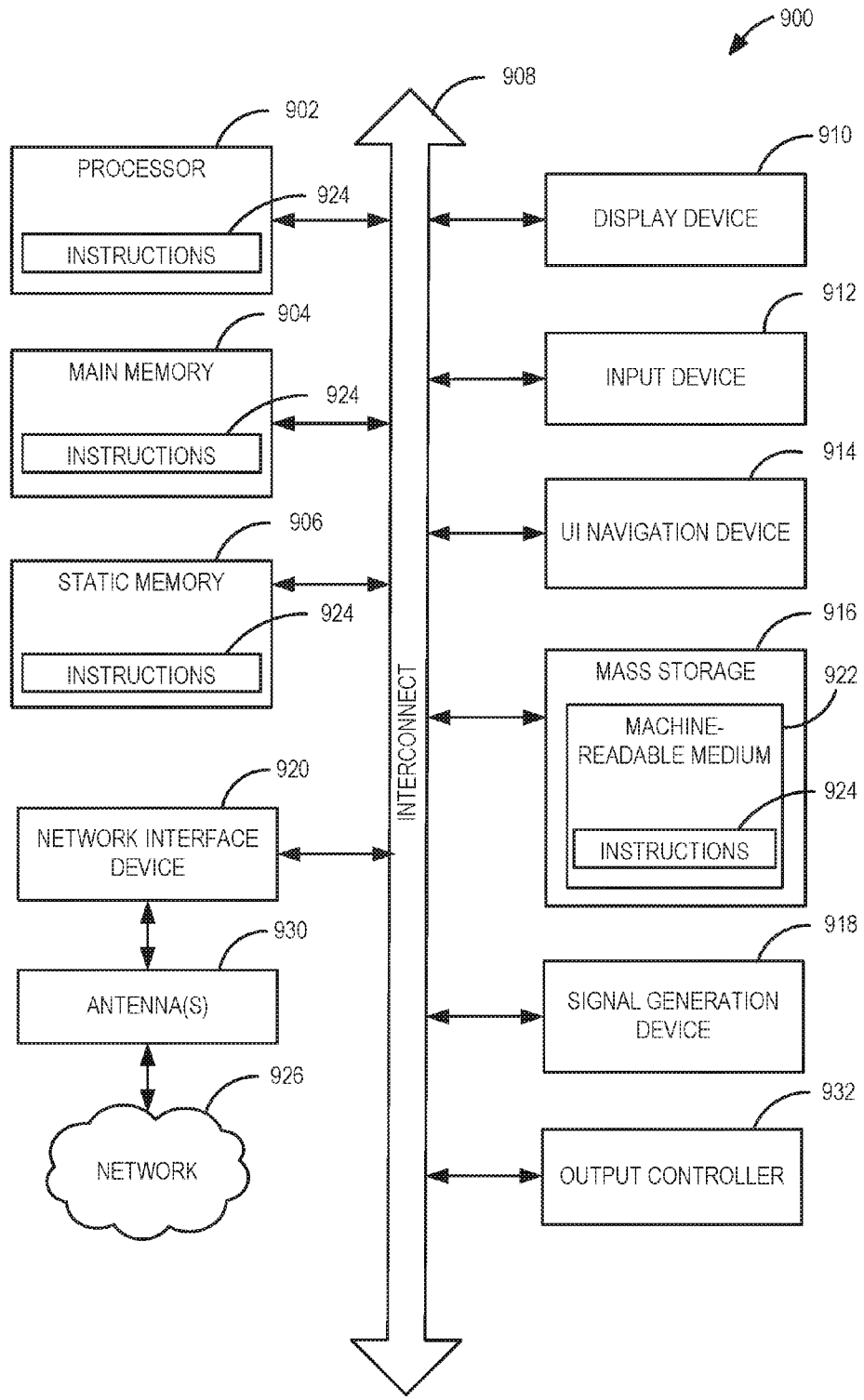
FIG. 9 illustrates a wireless device in accordance with some embodiments.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a master station 102, HE station 104, IoT device 108, a legacy device 106, station 201, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 902 and/or instructions 924 may comprise processing circuitry.

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques. The term "transmission medium" shall be taken to include any intangible medium that is capable of storing, encoding or carrying instructions for execution by the machine 900, and includes digital or analog communications signals or other intangible medium to facilitate communication of such software.

Example 1 is an apparatus of a station. The apparatus may comprise memory and processing circuitry coupled to the memory. The processing circuitry may be configured to encode a first packet to indicate to an access point to start discovery of Internet of Things (IoT) devices, and configure the station to transmit the first packet to the access point. The processing circuitry may be further configured to decode a second packet from the access point, wherein the second packet comprises one or more identifications of IoT devices, where the IoT devices corresponding to the one or more identifications of IoT devices are unauthenticated with the access point, and where the second packet is in response to the first packet, and receive a selection from an application of the station of one of the one or more identifications of the IoT devices. The processing circuitry may be further configured to encode a third packet comprising the selected one of the one or more identifications of the IoT devices and an indication that the access point is to request establishment of a secure session with the IoT device corresponding to the selected one of the one or more identifications of the IoT devices.

In Example 2, the subject matter of Example 1 can optionally include where the processing circuitry is further configured to: decode a fourth packet with an indication that the access point has established a secure session with the IoT device corresponding to the one of the one or more identifications of the IoT devices.

In Example 3, the subject matter of Examples 1 or 2 can optionally include where the processing circuitry is further configured to: decode a fourth packet that initiates an establishment of a secure session between the station and the IoT device corresponding to the one of the one or more identifications of the IoT devices.

In Example 4, the subject matter of any of Examples 1-3 can optionally include where the fourth packet comprises Diffie-Hellman (DH) parameters signed by a private key of the IoT device corresponding to the one of the one or more identifications of the IoT devices.

In Example 5, the subject matter of any of Examples 1-4 can optionally include where the processing circuitry is further configured to: encode the first packet to indicate to the access point to start discovery of IoT devices with a type that matches a group type.

In Example 6, the subject matter of any of Examples 1-5 can optionally include where the group type is one of the following group: a temperature type, a home sensor type, a video type, a security type, a home security type, and a home monitoring type.

In Example 7, the subject matter of any of Examples 1-6 can optionally include where the processing circuitry is further configured to: encode a fourth packet to associate with the access point; and encode one or more additional packets to establish a secure connection with the access point.

In Example 8, the subject matter of Example 7 can optionally include where the processing circuitry is further configured to: decode a notification from the access point, where the notification is from the IoT device corresponding to the one of the one or more identifications of the IoT devices, and where the notification is encrypted with a key established with the access point.

In Example 9, the subject matter of Example 7 can optionally include where the processing circuitry is further configured to decode a notification from the access point, where the notification is from the IoT device corresponding to the one of the one or more identifications of the IoT devices, and where the notification is encrypted with a key established with the IoT device corresponding to the one of the one or more identifications of the IoT devices.

In Example 10, the subject matter of Example 7 can optionally include where the processing circuitry is further configured to: encode a command, where the command is for the IoT device corresponding to the one of the one or more identifications of the IoT devices, and where the command is encrypted with a key established with the IoT device corresponding to the one of the one or more identifications of the IoT devices.

In Example 11, the subject matter of any of Examples 1-10 can optionally include where the IoT devices are configured to transmit packets only on sub-channels less than 20 MHz.

In Example 12, the subject matter of any of Examples 1-11 can optionally include where the station and the access point are each one from the following group: an Institute of Electrical and Electronic Engineers (IEEE) 802.11ax access point, an IEEE 802.11ax station, an IEEE 802.11 access point, and an IEEE 802.11 station.

In Example 13, the subject matter of any of Examples 1-12 can optionally include transceiver circuitry coupled to the memory; and, one or more antennas coupled to the transceiver circuitry.

In Example 14, the subject matter of Example 13 can optionally include where the processing circuitry is further configured to: transmit the first packet to the access point.

Example 15 is anon-transitory computer-readable storage medium that stores instructions for execution by one or more processors. The instructions to configure the one or more processors to cause a station to: encode a first packet to indicate to an access point to start discovery of Internet of Things (IoT) devices, and configure the station to transmit the first packet to the access point. The instructions to further configure the one or more processors to cause a station to: decode a second packet from the access point, where the second packet comprises one or more identifications of IoT devices, where the IoT devices corresponding to the one or more identifications of IoT devices are unauthenticated with the access point, and wherein the second packet is in response to the first packet. The instructions to further configure the one or more processors to cause a station to: receive a selection from an application of the station of one of the one or more identifications of the IoT devices, and encode a third packet comprising the selected one of the one or more identifications of the IoT devices and an indication that the access point is to request establishment of a secure session with the IoT device with the one of the one or more identifications corresponding to the one of the one or more identifications of the IoT devices.

In Example 16, the subject matter of Example 15 can optionally include where the instructions to further configure the one or more processors to cause the station to: decode a fourth packet with an indication that the access point has established a secure session with the IoT device corresponding to the one of the one or more identifications of the IoT devices.

In Example 17, the subject matter of Examples 15 or 16 can optionally include where the instructions to further configure the one or more processors to cause the station to: decode a fourth packet that initiates an establishment of a secure session between the station and the IoT device corresponding to the one of the one or more identifications of the IoT devices.

In Example 18, the subject matter of any of Examples 15-17 can optionally include where the fourth packet comprises Diffie-Hellman (DH) parameters signed by a private key of the IoT device corresponding to the one of the one or more identifications of the IoT devices.

Example 19 is an apparatus of an access point comprising memory and processing circuitry coupled to the memory. The processing circuitry may be configured to: decode a first packet from a station, where the first packet indicates that the access point is to start discovery of Internet of Things (IoT) devices, and decode one or more advertisement packets from an IoT device, the advertisement packets comprising an identification of the corresponding IoT device. The processing circuitry may be further configured to encode a second packet to the station, where the second packet comprises one or more identifications of IoT devices, where the IoT devices corresponding to the one or more identifications of IoT devices are unauthenticated with the access point, and where the second packet is in response to the first packet. The processing circuitry may be configured to decode a third packet from the station, where the third packet comprises one of the one or more identifications of the IoT devices, and encode a fourth packet, the fourth packet comprising a request to establish a secure session with the IoT device corresponding to the one of the one or more identifications of the IoT devices.

In Example 20, the subject matter of Example 19 can optionally include where the processing circuitry is further configured to encode a fifth packet with an indication that the access point has established a secure session with the IoT device corresponding to the one of the one or more identifications of the IoT devices.

In Example 21, the subject matter of any Examples 19 or 20 can optionally include where the processing circuitry is further configured to: encode a fifth packet that initiates an establishment of a secure session between the station and the IoT device corresponding to the one of the one or more identifications of the IoT devices.

In Example 22, the subject matter of Example 21 can optionally include where the fifth packet comprises Diffie-Hellman (DH) parameters signed by a private key of the access point.

In Example 23, the subject matter of any of Examples 19-22 can optionally include transceiver circuitry coupled to the memory; and, one or more antennas coupled to the transceiver circuitry.

Example 24 is a method performed by a station. The method including encoding a first packet to indicate to an access point to start discovery of Internet of Things (IoT) devices, configuring the station to transmit the first packet to the access point, and decoding a second packet from the access point, wherein the second packet comprises one or more identifications of IoT devices, where the IoT devices corresponding to the one or more identifications of IoT devices are unauthenticated with the access point, and where the second packet is in response to the first packet. The method may further include receiving a selection from an application of the station of one of the one or more identifications of the IoT devices, and encoding a third packet comprising the selected one of the one or more identifications of the IoT devices and an indication that the access point is to request establishment of a secure session with the IoT device with the one of the one or more identifications corresponding to the one of the one or more identifications of the IoT devices.

In Example 25, the subject matter of Example 25 can optionally include decoding a fourth packet with an indication that the access point has established a secure session with the IoT device corresponding to the one of the one or more identifications of the IoT devices.

Example 26 is an apparatus of a station including means for encoding a first packet to indicate to an access point to start discovery of Internet of Things (IoT) devices, means for configuring the station to transmit the first packet to the access point, and means for decoding a second packet from the access point, wherein the second packet comprises one or more identifications of IoT devices, wherein the IoT devices corresponding to the one or more identifications of IoT devices are unauthenticated with the access point, and wherein the second packet is in response to the first packet. The apparatus may further include means for receiving a selection from an application of the station of one of the one or more identifications of the IoT device, and means for encoding a third packet comprising the selected one of the one or more identifications of the IoT devices and an indication that the access point is to request establishment of a secure session with the IoT device corresponding to the selected one of the one or more identifications of the IoT devices.

In Example 27, the subject matter of Example 26 can optionally include means for decoding a fourth packet with an indication that the access point has established a secure session with the IoT device corresponding to the one of the one or more identifications of the IoT devices.

In Example 28, the subject matter of Examples 26 or 27 can optionally include means for decoding a fourth packet that initiates an establishment of a secure session between the station and the IoT device corresponding to the one of the one or more identifications of the IoT devices.

In Example 29, the subject matter of any of Examples 26-28 can optionally include where the fourth packet comprises Diffie-Hellman (DH) parameters signed by a private key of the IoT device corresponding to the one of the one or more identifications of the IoT devices.

In Example 30, the subject matter of any of Examples 26-29 can optionally include means for encoding the first packet to indicate to the access point to start discovery of IoT devices with a type that matches a group type.

In Example 31, the subject matter of any of Examples 26-30 can optionally include where the group type is one of the following group: a temperature type, a home sensor type, a video type, a security type, a home security type, and a home monitoring type.

In Example 32, the subject matter of any of Examples 26-31 can optionally include means for encoding a fourth packet to associate with the access point, and means for encoding one or more additional packets to establish a secure connection with the access point.

In Example 33, the subject matter of Example 32 can optionally include means for decoding a notification from the access point, wherein the notification is from the IoT device corresponding to the one of the one or more identifications of the IoT devices, and where the notification is encrypted with a key established with the access point.

In Example 34, the subject matter of Example 32 can optionally include means for decoding a notification from the access point, where the notification is from the IoT device corresponding to the one of the one or more identifications of the IoT devices, and where the notification is encrypted with a key established with the IoT device corresponding to the one of the one or more identifications of the IoT devices.

In Example 35, the subject matter of Example 32 can optionally include means for encoding a command, where the command is for the IoT device corresponding to the one of the one or more identifications of the IoT devices, and where the command is encrypted with a key established with the IoT device corresponding to the one of the one or more identifications of the IoT devices.

In Example 36, the subject matter of any of Examples 26-35 can optionally include where the IoT devices are configured to transmit packets only on sub-channels less than 20 MHz.

In Example 37, the subject matter of any of Examples 26-36 can optionally include where the station and the access point are each one from the following group: an Institute of Electrical and Electronic Engineers (IEEE) 802.11ax access point, an IEEE 802.11ax station, an IEEE 802.11 access point, and an IEEE 802.11 station.

In Example 38, the subject matter of any of Examples 26-37 can optionally include means for transmitting and receiving radio signals.

In Example 39, the subject matter of Example 38 can optionally include means for transmitting the first packet to the access point.

Example 40 is a non-transitory computer-readable storage medium that stores instructions for execution by one or more processors. The instructions to configure the one or more processors to cause an access point to: decode a first packet from a station, where the first packet indicates that the access point is to start discovery of Internet of Things (IoT) devices, and decode one or more advertisement packets from an IoT device, the advertisement packets comprising an identification of the corresponding IoT device. The instructions to further configure the one or more processors to cause an access point to: encode a second packet to the station, where the second packet comprises one or more identifications of IoT devices, where the IoT devices corresponding to the one or more identifications of IoT devices are unauthenticated with the access point, and wherein the second packet is in response to the first packet. The instructions to configure the one or more processors to cause an access point to: decode a third packet from the station, where the third packet comprises one of the one or more identifications of the IoT devices, and encode a fourth packet, the fourth packet comprising a request to establish a secure session with the IoT device corresponding to the one of the one or more identifications of the IoT devices.

In Example 41, the subject matter of Example 40 can optionally include where the instructions to further configure the one or more processors to cause the access point to: encode a fifth packet with an indication that the access point has established a secure session with the IoT device corresponding to the one of the one or more identifications of the IoT devices.

In Example 42, the subject matter of Examples 40 or 41 can optionally include where the instructions to further configure the one or more processors to cause the access point to: encode a fifth packet that initiates an establishment of a secure session between the station and the IoT device corresponding to the one of the one or more identifications of the IoT devices.

In Example 43, the subject matter of any of Examples 40-42 can optionally include where the fifth packet comprises Diffie-Hellman (DH) parameters signed by a private key of the access point.

In Example 44, the subject matter of any of Examples 40-43 can optionally include one or more antennas coupled to the processing circuitry.

Example 45 is a method performed by an access point. The method may include decoding a first packet from a station, where the first packet indicates that the access point is to start discovery of Internet of Things (IoT) devices, and decoding one or more advertisement packets from an IoT device, the advertisement packets comprising an identification of the corresponding IoT device. The method may further include encoding a second packet to the station, wherein the second packet comprises one or more identifications of IoT devices, where the IoT devices corresponding to the one or more identifications of IoT devices are unauthenticated with the access point, and where the second packet is in response to the first packet. The method may further include decoding a third packet from the station, where the third packet comprises one of the one or more identifications of the IoT devices, and encoding a fourth packet, the fourth packet comprising a request to establish a secure session with the IoT device corresponding to the one of the one or more identifications of the IoT devices.

In Example 46, the subject matter of Example 45 can optionally include encoding a fifth packet with an indication that the access point has established a secure session with the IoT device corresponding to the one of the one or more identifications of the IoT devices.

In Example 47, the subject matter of Examples 45 or 46 can optionally include encode a fifth packet that initiates an establishment of a secure session between the station and the IoT device corresponding to the one of the one or more identifications of the IoT devices.

In Example 48, the subject matter of any of Examples 45-47 can optionally include where the fifth packet comprises Diffie-Hellman (DH) parameters signed by a private key of the access point.

Example 49 is an apparatus of an access point. The apparatus including means for decoding a first packet from a station, where the first packet indicates that the access point is to start discovery of Internet of Things (IoT) devices, and means for decoding one or more advertisement packets from an IoT device, the advertisement packets comprising an identification of the corresponding IoT device. The apparatus may further include means for encoding a second packet to the station, where the second packet comprises one or more identifications of IoT devices, where the IoT devices corresponding to the one or more identifications of IoT devices are unauthenticated with the access point, and where the second packet is in response to the first packet. The apparatus may further include means for decoding a third packet from the station, where the third packet comprises one of the one or more identifications of the IoT devices, and means for encoding a fourth packet, the fourth packet comprising a request to establish a secure session with the IoT device corresponding to the one of the one or more identifications of the IoT devices.

In Example 50, the subject matter of Example 49 can optionally include means for encoding a fifth packet with an indication that the access point has established a secure session with the IoT device corresponding to the one of the one or more identifications of the IoT devices.

In Example 51, the subject matter of Examples 49 or 50 can optionally include means for encoding a fifth packet that initiates an establishment of a secure session between the station and the IoT device corresponding to the one of the one or more identifications of the IoT devices.

In Example 52, the subject matter of any of Examples 49-51 can optionally include where the fifth packet comprises Diffie-Hellman (DH) parameters signed by a private key of the access point.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station, the apparatus comprising: memory; and, processing circuitry coupled to the memory, the processing circuitry configured to:
    encode a first packet to indicate to an access point to start discovery of Internet of Things (IoT) devices;
    configure the station to transmit the first packet to the access point;
    decode a second packet from the access point, wherein the second packet comprises one or more identifications of IoT devices, wherein the IoT devices corresponding to the one or more identifications of IoT devices are unauthenticated with the access point, and wherein the second packet is in response to the first packet;
    receive a selection from an application of the station of one of the one or more identifications of the IoT devices;
    encode a third packet comprising the selected one of the one or more identifications of the IoT devices and an indication that the access point is to request establishment of a secure session with the IoT device corresponding to the selected one of the one or more identifications of the IoT devices;
    decode a fourth packet that initiates an establishment of a secure session between the station and the IoT device corresponding to the one of the one or more identifications of the IoT devices, wherein the fourth packet is received from the IoT device; and
    encode a response to the fourth packet to establish the secure session between the station and the IoT device.

2. The apparatus of claim 1, wherein the processing circuitry is further configured to:
    decode a fourth packet with an indication that the access point has established a secure session with the IoT device corresponding to the one of the one or more identifications of the IoT devices.

3. The apparatus of claim 1, wherein the fourth packet comprises Diffie-Hellman (DH) parameters signed by a private key of the IoT device corresponding to the one of the one or more identifications of the IoT devices.

4. The apparatus of claim 1, wherein the processing circuitry is further configured to:
encode the first packet to indicate to the access point to start discovery of IoT devices with a type that matches a group type.

5. The apparatus of claim 4, wherein the group type is one of the following group: a temperature type, a home sensor type, a video type, a security type, a home security type, and a home monitoring type.

6. The apparatus of claim 1, wherein the processing circuitry is further configured to:
encode a fourth packet to associate with the access point; and
encode one or more additional packets to establish a secure connection with the access point.

7. The apparatus of claim 6, wherein the processing circuitry is further configured to:
decode a notification from the access point, wherein the notification is from the IoT device corresponding to the one of the one or more identifications of the IoT devices, and wherein the notification is encrypted with a key established with the access point.

8. The apparatus of claim 6, wherein the processing circuitry is further configured to:
decode a notification from the access point, wherein the notification is from the IoT device corresponding to the one of the one or more identifications of the IoT devices, and wherein the notification is encrypted with a key established with the IoT device corresponding to the one of the one or more identifications of the IoT devices.

9. The apparatus of claim 6, wherein the processing circuitry is further configured to:
encode a command, wherein the command is for the IoT device corresponding to the one of the one or more identifications of the IoT devices, and wherein the command is encrypted with a key established with the IoT device corresponding to the one of the one or more identifications of the IoT devices.

10. The apparatus of claim 1, wherein the IoT devices are configured to transmit packets only on sub-channels less than 20 MHz.

11. The apparatus of claim 1, wherein the station and the access point are each one from the following group: an Institute of Electrical and Electronic Engineers (IEEE) 802.11ax access point, an IEEE 802.11ax station, an IEEE 802.11 access point, and an IEEE 802.11 station.

12. The apparatus of claim 1, further comprising one or more antennas coupled to the processing circuitry.

13. The apparatus of claim 12, wherein the processing circuitry is further configured to:
transmit the first packet to the access point.

14. A non-transitory computer-readable storage medium that stores instructions for execution by one or more processors of an apparatus of a station, the instructions to configure the one or more processors to:
encode a first packet to indicate to an access point to start discovery of Internet of Things (IoT) devices;
configure the station to transmit the first packet to the access point;

decode a second packet from the access point, wherein the second packet comprises one or more identifications of IoT devices, wherein the IoT devices corresponding to the one or more identifications of IoT devices are unauthenticated with the access point, and wherein the second packet is in response to the first packet;
receive a selection from an application of the station of one of the one or more identifications of the IoT devices;
encode a third packet comprising the selected one of the one or more identifications of the IoT devices and an indication that the access point is to request establishment of a secure session with the IoT device with the one of the one or more identifications corresponding to the one of the one or more identifications of the IoT devices; and
decode a fourth packet that initiates an establishment of a secure session between the station and the IoT device corresponding to the one of the one or more identifications of the IoT devices, wherein the fourth packet is received from the IoT device; and
encode a response to the fourth packet to establish the secure session between the station and the IoT device.

15. The non-transitory computer-readable storage medium of claim 14, wherein the instructions to further configure the one or more processors to cause the station to:
decode a fifth packet with an indication that the access point has established a secure session with the IoT device corresponding to the one of the one or more identifications of the IoT devices.

16. The non-transitory computer-readable storage medium of claim 14, wherein the fourth packet comprises Diffie-Hellman (DH) parameters signed by a private key of the IoT device corresponding to the one of the one or more identifications of the IoT devices.

17. An apparatus of an access point comprising memory and processing circuitry coupled to the memory, the processing circuitry configured to:
decode a first packet from a station, wherein the first packet indicates that the access point is to start discovery of Internet of Things (IoT) devices;
decode one or more advertisement packets from an IoT device, the advertisement packets comprising an identification of the corresponding IoT device;
encode a second packet to the station, wherein the second packet comprises one or more identifications of IoT devices, wherein the IoT devices corresponding to the one or more identifications of IoT devices are unauthenticated with the access point, and wherein the second packet is in response to the first packet;
decode a third packet from the station, wherein the third packet comprises one of the one or more identifications of the IoT devices;
encode a fourth packet, the fourth packet comprising a request to establish a secure session with the IoT device corresponding to the one of the one or more identifications of the IoT devices; and
encode a fifth packet that initiates an establishment of a secure session between the station and the IoT device corresponding to the one of the one or more identifications of the IoT devices.

18. The apparatus of claim 17, wherein the processing circuitry is further configured to:
encode a sixth packet with an indication that the access point has established a secure session with the IoT device corresponding to the one of the one or more identifications of the IoT devices.

19. The apparatus of claim 17, wherein the fifth packet comprises Diffie-Hellman (DH) parameters signed by a private key of the access point.

20. The apparatus of claim 17, further comprising: transceiver circuitry coupled to the processing circuitry; and, one or more antennas coupled to the transceiver circuitry.

21. A method performed by an apparatus of a station, the method comprising:
   encoding a first packet to indicate to an access point to start discovery of Internet of Things (IoT) devices;
   configuring the station to transmit the first packet to the access point;
   decoding a second packet from the access point, wherein the second packet comprises one or more identifications of IoT devices, wherein the IoT devices corresponding to the one or more identifications of IoT devices are unauthenticated with the access point, and wherein the second packet is in response to the first packet;
   receiving a selection from an application of the station of one of the one or more identifications of the IoT devices;
   encoding a third packet comprising the selected one of the one or more identifications of the IoT devices and an indication that the access point is to request establishment of a secure session with the IoT device with the one of the one or more identifications corresponding to the one of the one or more identifications of the IoT devices;
   decode a fourth packet that initiates an establishment of a secure session between the station and the IoT device corresponding to the one of the one or more identifications of the IoT devices, wherein the fourth packet is received from the IoT device; and
   encode a response to the fourth packet to establish the secure session between the station and the IoT device.

22. The method of claim 21, the method further comprising:
   decoding a fifth packet with an indication that the access point has established a secure session with the IoT device corresponding to the one of the one or more identifications of the IoT devices.

* * * * *